Patented Sept. 27, 1927.

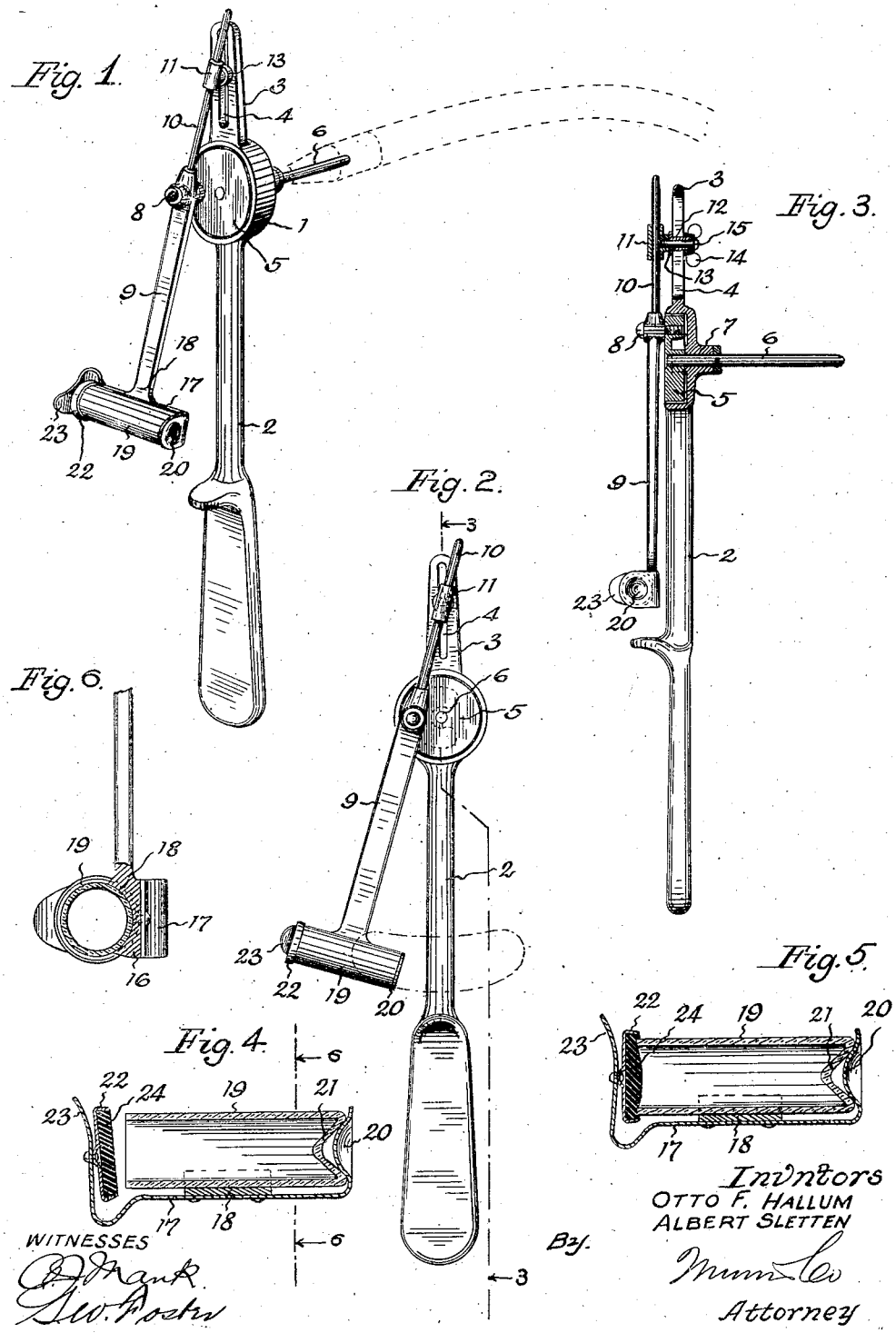

1,643,847

UNITED STATES PATENT OFFICE.

OTTO F. HALLUM AND ALBERT SLETTEN, OF MINNEAPOLIS, MINNESOTA.

DENTAL AMALGAMATOR.

Application filed September 25, 1925, Serial No. 58,614. Renewed March 4, 1927.

This invention relates to dental amalgamators, an object of the invention being to provide an apparatus which may constitute an attachment for a motor shaft so that mechanically dental amalgam may be quickly and properly prepared for use.

The ordinary method of preparing silver amalgam for filling teeth, which is usually done with a mortar and pestle, requires about five minutes to prepare the amalgam which consists of powdered silver and quicksilver in proper proportions to make amalgam of the right consistency for use in filling teeth; and while of course my invention is particularly adapted for use in the making of amalgam it may be used in connection with other substances.

With my improved apparatus the time employed is greatly reduced over the ordinary hand method and much superior results are obtained, some of which may be enumerated as follows:

That the apparatus is simple and inexpensive to manufacture and is not liable to get out of order.

That it can be attached to the engine head and requires no separate motor.

That it can be operated either manually or mechanically.
That it will make a superior amalgam by producing a better and more thorough mixture of the silver and quicksilver than by the use of the mortar and pestle or any other method now in use.
That the silver amalgam required can be produced in less than one minute of time and is a perfect mixture that will take a high polish.

That the silver amalgam so produced is as perfect as amalgam as can be produced by any known means and will make a good substantial filling that is lasting and durable and subject to a fine, smooth and perfect polish and surface.
That such perfect amalgam is produced by the circular motion imparted to the amalgam container.

That the amount of motion can be adjusted by varying the length of stroke.
That the intensity of motion can be changed by increasing or decreasing the speed of the rotating member.

That this method of making amalgam is quick, clean and sanitary and a better amalgam can be produced in one-fifth of the time than by former methods and devices.

It is counterbalanced and free from unnecessary vibration.

With these and other objects in view, the invention consists in certain novel features of construction and combinations and arrangements of parts, which will be more fully hereinafter described and pointed out in the claims.

In the accompanying drawings—
Figure 1 is a perspective view of my improved dental amalgamator;
Figure 2 is a view in front elevation thereof;
Figure 3 is a view in longitudinal section on the line 3—3 of Figure 2;
Figures 4 and 5 are views in longitudinal section of the container and its supporting means;
Figure 6 is a view in transverse section on the line 6—6 of Figure 4.

1 represents a cylindrical casing having integral depending counterbalancing or weighted arms 2 depending therefrom. An upwardly projecting integral arm 3 is also provided on casing 1 and is formed with a longitudinal slot 4.

A disk 5 is mounted to turn in casing 1 and is secured to a shaft 6 which projects through a central bearing 7 in the rear of the casing and is adapted to be coupled to any source of power but is particularly adapted to be coupled to the power shaft of a dental motor such as indicated by dotted lines in Figure 1.

The disk 5 is made with a crank pin 8, which may constitute an ordinary screw, and on this crank pin 8 a rocker lever 9 is pivotally mounted. The upper extremity of the rocker lever 9 constitutes a rod 10 which slides freely through a sleeve 11, said sleeve being pivotally connected to a collar 12, the latter mounted to slide in the slot 4 of arm 3.

The particular construction of the collar is illustrated in Figure 3 in which it will be noted that this collar has a flange 13 at one end bearing against one face of the arm 3 while a wing nut 14 is screwed on the other end of the collar and constitutes a bearing against the opposite face of the arm so as to hold the collar against displacement.

A screw 15 is extended through the nut 14, through the collar 12 and into the sleeve 11, so that by reason of this construction the sleeve has free pivotal movement relative to the collar, and the latter is adapted to slide freely in the slot 4 but the parts can be readily assembled or taken apart at the will of the user.

A crosshead 16 is formed at the lower free end of the rocker lever 9 and a strip of spring metal 17 is secured to the back of the head 16, the front face of said head being curved, as shown at 18, to conform to the transverse curvature of a container 19. This spring strip 17 is bent forwardly at one end and is made of general cup shape, as shown at 20, so as to fit into the recessed bottom 21 of container 19.

The container 19 may be of general cylindrical form or it may be of any other shape desired, and its open end is adapted to be closed by a cover 22 carried by a spring tongue 23 constituting an integral extension of the strip 17. The tension of this tongue 23 is toward the end of the container 19 so as to hold the cover tightly in place, and this cover is preferably formed with a rubber or other facing 24 to insure a tight juncture of the container.

Figure 4 shows the cover swung outwardly to allow the container to be removed, and Figure 5 shows the container securely held in operative position.

The operation of the device is as follows:

The elements or material to be mixed are located in the container 19, and the latter is secured in position on the head 16 by means of the spring strip as above explained. The shaft 6 is then operatively connected to the source of power. As the crank disk 5 is revolved, it will impart a rotary motion to the intermediate portion of the rocker lever 9 but due to the fact that one end of this rocker lever is projected through the sleeve 11 and the movement of the latter is longitudinal of the arm 3, a somewhat elliptical motion will be imparted to the container. This motion is as rapid as may be desired, causing the contents of the container to be thoroughly mixed in a relatively short space of time. The counterbalancing arm 2 holds the arm 3 in substantially vertical position at all times, and while we have illustrated in dotted lines in Figure 2 an approximate path of movement of the container it is obvious that there may be some slight deviation in this path due to the different swinging movement of the arm 3 or other condition, but in any event the container will be given a rapid movement longitudinally thereof which will cause the contents to be thrown from one end to the other of the container and a thorough mixing action will be had.

Various slight changes and alterations might be made in the general form of the parts described without departing from the spirit of the invention, and hence we do not limit ourselves to the precise details set forth but consider ourselves at liberty to make such slight changes and alterations as fairly fall within the spirit and scope of the appended claims.

We claim:

1. A dental amalgamator, including a cylindrical casing, a crank disk mounted to turn in the casing, a shaft operatively connected to the disk and adapted to be operatively connected to a source of power, a rocker lever connected to the crank disk, a counterbalanced arm depending from the casing, a slotted lever extending upwardly from the casing, means mounted to move longitudinally in the slot and having swivel connection with the upper end of the rocker lever, and means at the lower end of the rocker lever for supporting a container.

2. A dental amalgamator, including a cylindrical casing, a crank disk mounted to turn in the casing, a shaft operatively connected to the disk and adapted to be operatively connected to a source of power, a rocker lever connected to the crank disk, a counterbalanced arm depending from the casing, a slotted lever extending upwardly from the casing, means mounted to move longitudinally in the slot and having swivel connection with the upper end of the rocker lever, a head at the lower end of the rocker lever, clamping means on the head, and a container adapted to be secured in said clamping means.

3. A dental amalgamator, including a cylindrical casing, a crank disk mounted to turn in the casing, a shaft operatively connected to the disk and adapted to be operatively connected to a source of power, a rocker lever connected to the crank disk, a counterbalanced arm depending from the casing, a slotted lever extending upwardly from the casing, means mounted to move longitudinally in the slot and having swivel connection with the upper end of the rocker lever, a head at the lower end of the rocker lever, clamping means on the head, a container adapted to be secured in said clamping means, said container having a recessed closed end, one member of said clamp engaging the closed end, a spring tongue constituting the other end of said clamping means, and a cover for said container secured to said tongue.

OTTO F. HALLUM.
ALBERT SLETTEN.